United States Patent [19]

Skinner et al.

[11] Patent Number: 4,802,010
[45] Date of Patent: Jan. 31, 1989

[54] METHOD AND APPARATUS FOR GENERATING AN ADAPTIVE PEAKING SIGNAL INCREASING THE SHARPNESS OF A VIDEO SIGNAL

[75] Inventors: Kenneth R. Skinner, Jefferson City; James E. Hitchcock, Knoxville, both of Tenn.

[73] Assignee: North American Philips Consumer Electronics Corp., Knoxville, Tenn.

[21] Appl. No.: 169,150

[22] Filed: Mar. 4, 1988

Related U.S. Application Data

[63] Continuation of Ser. No. 931,385, Nov. 14, 1986, abandoned.

[51] Int. Cl.⁴ ................................................ H04N 5/14
[52] U.S. Cl. .................................... 358/166; 358/162; 358/169
[58] Field of Search ............... 358/166, 160, 162, 164, 358/169, 167

[56] References Cited

U.S. PATENT DOCUMENTS

| | | | |
|---|---|---|---|
| 4,080,627 | 3/1978 | Wheeler | 358/162 |
| 4,263,616 | 4/1981 | Lee | 358/166 |
| 4,571,620 | 2/1986 | Anderson | 358/166 |

Primary Examiner—Tommy P. Chin
Attorney, Agent, or Firm—Marianne R. Rich

[57] ABSTRACT

A conventional peaking signal derived by delaying the incoming video or luminance signal first by one horizontal line delay and then by a second horizontal line delay is modified by multiplication with an adaptive factor. The adaptive factor is derived by first taking the difference between the incoming signal and the twice delayed signal, then deriving the magnitude or the square of this difference and multiplying this by a factor K empirically derived for the particular display device. The resultant signal is then subtracted from unity. This yields the factor by which the conventional peaking signal is multiplied. The conventional signal multiplied by this factor constitutes the final peaking signal which is added to the 1H delayed luminance signal to yield the desired peaked luminance signal.

10 Claims, 2 Drawing Sheets

Adaptive Peaking Method

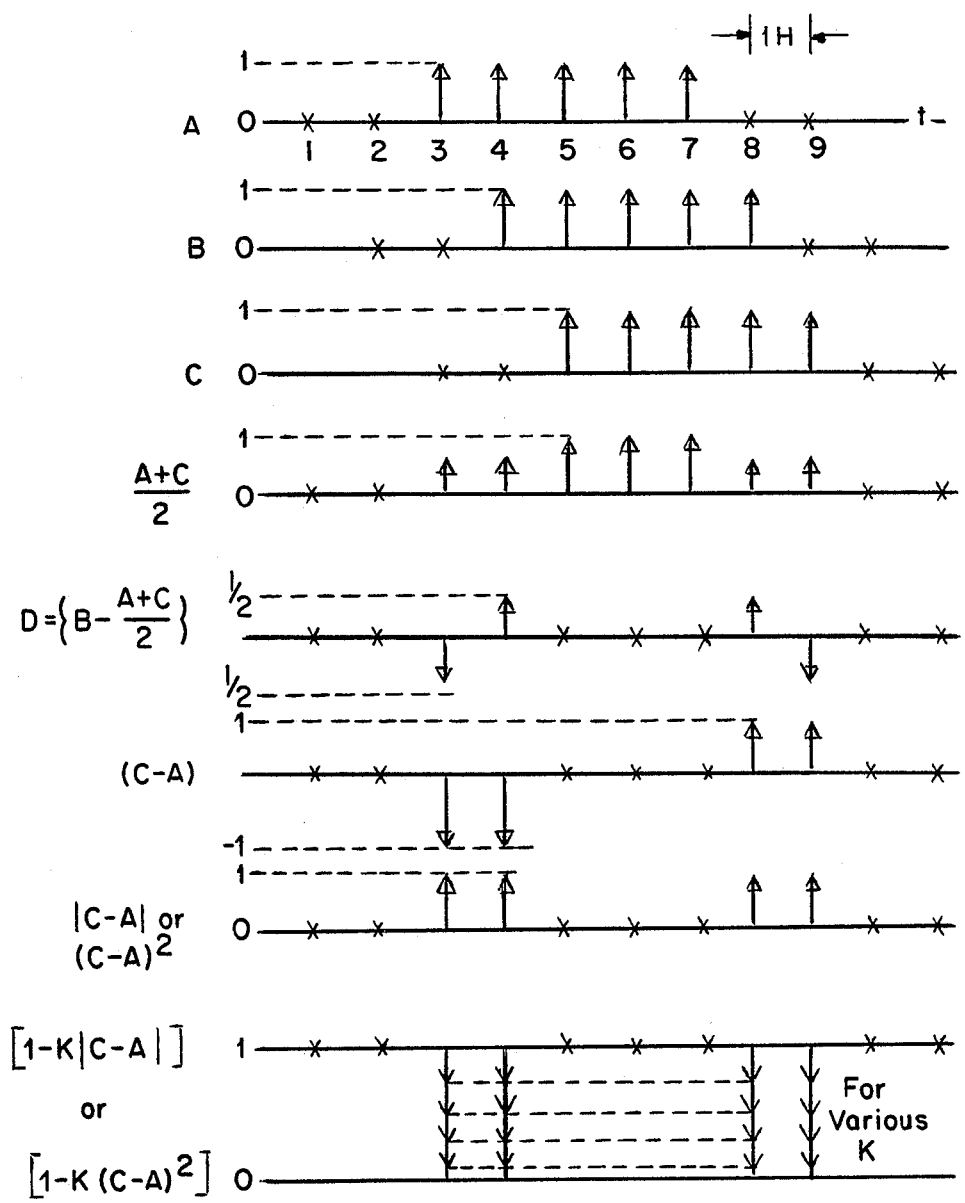

METHOD AND APPARATUS FOR GENERATING AN ADAPTIVE PEAKING SIGNAL INCREASING THE SHARPNESS OF A VIDEO SIGNAL

This is a continuation of application Ser. No. 931,385, filed Nov. 14, 1986, now abandoned.

BACKGROUND OF THE DISCLOSURE

Cross-reference to related applications: Application entitled "Television Signal Processing Apparatus Including Rise Time Normalization and Noise Reduction", inventor: W. Miller; filed simultaneously herewith.

1. Field of the Invention

The present invention relates to peaking signals, that is signals which are added to video signals for the purpose of increasing the sharpness of the displayed picture.

2. Description of the Prior Art

In presently known television apparatus, peaking signals are added to the video signals to improve the sharpness of either vertical or horizontal transitions. Generally, the user sets the sharpness control to achieve a pleasing picture for mid range transitions. The adjustment is generally made so that low to medium level detail areas of a scene, such as leaves on a tree, fabric texture, facial lines, etc., are peaked for pleasing viewing. However, at this setting of the peaking control the areas of the scene having large amplitude video transitions, such as the edges of text characters, are over peaked. Spot blooming can also occur on large white going overshoots.

SUMMARY OF THE INVENTION

It is an object of the present invention to eliminate or substantially decrease the over peaking and spot blooming mentioned above without, however, substantially affecting the detail in the low to medium transition areas of the scene.

The invention is based on the realization that the above-mentioned undesired effects are due to the conventional method of generating the peaking signal, i.e. conventionally this signal is dependent on both the rate of change and the amplitude of the video transition. A peaking signal less dependent on transition amplitude would tend to decrease over-peaking and spot blooming.

To accomplish this end, the conventional (first) peaking signal is modified by multiplying it by an adaptive peaking component signal. In deriving the conventional peaking signal, the incoming video signal is delayed by a first time delay and a second time delay. Since both the incoming and the second delayed signal are readily available, the present invention teaches the subtraction of one from the other of the signals. The magnitude of the so-derived difference signal is multiplied by a constant, the product is subtracted from a second constant, preferably unity, and the resultant factor is used to multiply the conventional peaking signal.

Alternatively, the square of the difference signal can be substituted for the magnitude of the difference signal.

The present invention, as well as other objects and implementations thereof, will be more readily understood upon reference to the following description taken in conjunction with the accompanying drawing.

BRIEF DESCRIPTION OF THE DRAWING

FIG. 3 is a graphic representation of the method of the present invention.

DESCRIPTION OF THE PREFERRED EMBODIMENTS

Figure 1:
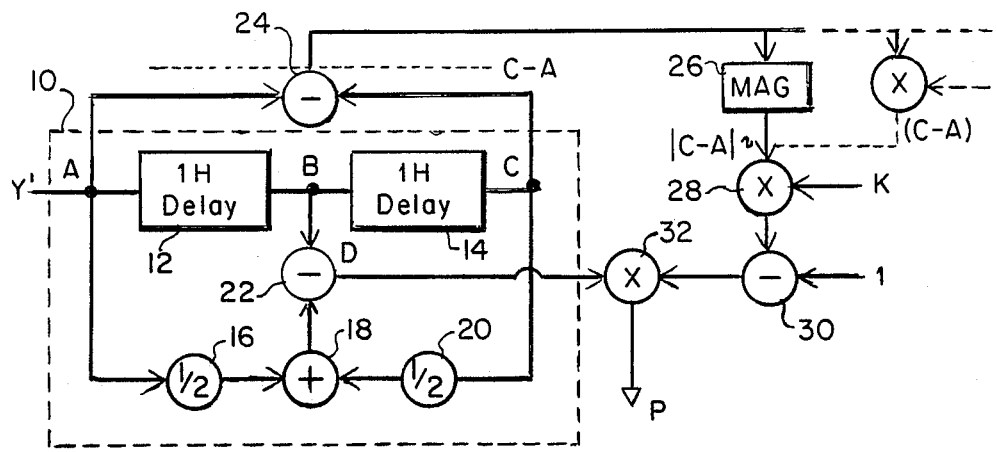
FIG. 1 is a block diagram illustrating the present invention as interconnected with a conventional vertical peaking circuit.

The circuit for generating the conventional peaking signal, i.e. signal to be added to the video signal to increase its sharpness is denoted by reference numeral 10 in FIG. 1 and enclosed in dashed lines. Block 10 generates a peaking signal for vertical peaking. The incoming video signal, e.g. the luminance signal in a color television receiver, is received at a terminal A. Terminal A is connected through a 1H delay 12 to a terminal B. Terminal B in turn is connected through a 1H, i.e. a one line, delay 14 to a terminal C. Further, terminal A is connected through a divider circuit 16 which divides its amplitude in two, to one terminal of a summing circuit 18. The other terminal of summing circuit 18 is connected to terminal C through a second divider circuit 20. The output of summing circuit 18 is connected to one input of a subtraction circuit 22 whose other input is connected to terminal B. The conventional peaking component signal is furnished at output terminal D of subtraction circuit 22.

It should be noted that the conventional circuit and the present invention can be implemented in either analog and digital form. Thus, dividers may be implemented as voltage dividers or operational amplifiers, summing circuits may be operational amplifiers, and the delay circuits may be standard 1H delay lines for an analog implementation. For digital implementations, divider circuits which divide by a half can be shift circuits. The same is true for delay circuits. Addition and subtraction circuits are standard digital circuits well known to anyone skilled in the art.

To implement the present invention, terminals A and C are connected to respective input terminals of a subtraction circuit 24. The output of subtraction circuit 24 is connected to a circuit generating the magnitude of this signal, i.e. the amplitude independent of sign. This circuit is denoted by reference numeral 26. The output of block 26 is multiplied by a constant factor K in a multiplier circuit 28. The output of multiplier circuit 28 is subtracted from unity in a subtraction circuit 30. The output of subtraction circuit 30 is applied to one input of a multiplying circuit 32. The other input of multiplying circuit 32 receives the conventional peaking signal. The output of multiplying circuit 32 is the adaptive peaking signal of the present invention.

The operation of the above described circuit will now be described with reference also to FIG. 3.

In FIG. 3, the incoming video signal at terminal A is illustrated in the correspondingly marked line A. Similarly, the signals at terminals B and C are shown on lines B and C of FIG. 3.

It is assumed that the signal received at terminal A is zero or black for the time intervals corresponding to lines 1 and 2. At line 3, a full transition to white occurs. The full white value remains until line 7 where it changes back to full black after expiration of another 1H time interval.

In line B, the same signal is shown, but delayed by one line interval. Similarly, the signal on line C is the same signal as that on line A, but delayed by two line intervals. The variation of A+C/2 is illustrated in the fourth line. The resulting conventional peaking signal is illustrated in the fifth line of FIG. 3. It should be noted that this conventional peaking signal is added to the signal at terminal B to form the peaked luminance signal. This is also true of the peaking component signal as modified by the adaptive circuit of the present invention.

Returning now to FIG. 3, it is noted that the addition of the conventional peaking signal as shown in line 5 to the signal of line B would, for a positive-going transition as illustrated in line A, result first in the addition of a component tending to drive the signal of line B in the opposite direction, i.e. towards a blacker level. In the subsequent H line, the peaking signal reverses and results in an addition to the signal on line B which drives in the same direction as the transition, i.e. the signal on line B is driven to an even whiter level. Since the signal was already at full white, this additional peaking component could cause it to be over-peaked or to bloom. The increase in the spot size resulting from the over-peaking would cause a definite deterioration of picture quality. Similarly, when a transition from white to black takes place in horizontal lines 8-9, the full white luminance signal of line B is augmented by a peaking signal having an amplitude of one half in H line 8, while the black signal in H line 9 is drive further in the black direction. While an improvement in sharpness would result by the increased difference between the luminance signal amplitude in H line 8 and 9, the blooming caused by the substantial over-peaking in line 8 is undesirable. It should be noted that the effect of a fully black (i.e. tube cutoff) luminance signal is not changed by the addition of a peaking signal. The value of the delayed luminance signal in H line 9 should thus be thought of as somewhat less than full black.

As can be seen with reference to the last two pairs of lines in FIG. 3, the over-peaking is substantially decreased or may be eliminated by use of the adaptive component of the present invention. The bottom pair of lines in FIG. 3 indicate the multiplication factor (adaptive peaking factor signal) which is to be applied to the conventional peaking signal present at terminal D of FIG. 1 and illustrated in the correspondingly marked line in FIG. 3. The multiplication factor is between 0 and 1, depending on the value of K. For K=0 the multiplication factor would be 1, i.e. the conventional peaking signal would be added to the signal of line B. If the value of the constant K is taken, for example, to be .5, the peaking signal in line 5 would be multiplied by one half. Signal B would still be decreased prior to a positive-going transition and increased upon occurrence of the transition, thereby increasing the difference in luminance signal ampitude from one H line to the next and thus the vertical sharpness of the picture; but the over-peaking at the large transitions would be substantially decreased. For K=1, no peaking signal would result when $|C-A|=1$, i.e. no over-peaking would occur for large luminance signal amplutide changes.

It should be noted that the above discussion holds true as well if the magnitude of C−A is replaced by $(C-A)^2$. This is indicated by dashed lines in FIG. 1.

Figure 2:
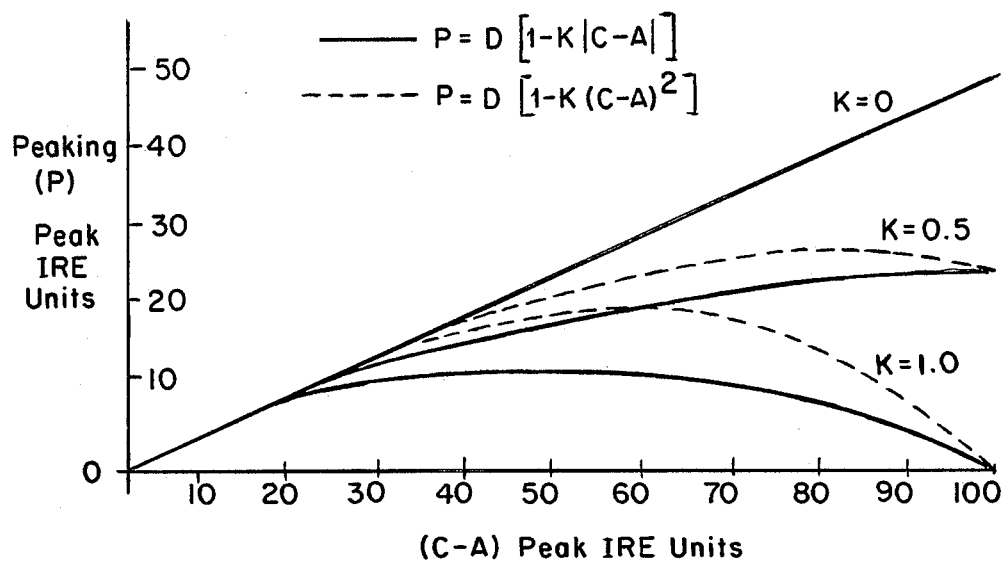
FIG. 2 is a plot of peaking signal as a function of transition amplitude at various values of K.

The effect of changes in the value of K for different values of C−A is illustrated in FIG. 2. The solid lines in FIG. 2 represent the variation of the peaking signal as a function of C−A when the magnitude of C−A is used in deriving the adaptive component. The dashed lines are the same plots when the value of $(C-A)^2$ is used. It will be noted that the adaptive peaking signal P actually goes to zero for a differential signal representing the maximum change (black to white or white to black), but approaches the normal peaking signal at low- to mid-level changes. The value chosen for K may be chosen empirically and will generally fall somewhere between K=1 and K=0.5. It is desirable to provide some peaking for the maximum change of (C−A), but to keep this peaking below that which would cause spot blooming of the particular display device.

It is thus seen that with the present invention the problems of over-peaking and spot blooming at high level transitions can be avoided without sacrificing the benefits of increased sharpness at low and mid level transitions.

Although the invention has been illustrated in particular embodiments, it is not to be limited to these embodiments, but should include in its scope variations and modifications in implementation which will readily occur to one skilled in the art and which are to be encompassed in the following claims.

We claim:

1. Apparatus for generating an adaptive peaking signal in response to an incoming video signal, comprising
    first means for generating a first peaking signal, said first means comprising first and second delay means for delaying said incoming video signal thereby furnishing first and second time delayed signals, and means connected to said first and second delay means for generating said first peaking signal said first peaking signal varying in dependence on said incoming video signal, and said first and second time-delayed signals;
    second means connected to said first means for combining only said second time delayed signal and said incoming video signal to generate a peaking factor signal; and
    third means connected to said second means and said first means for combining said first peaking signal and said peaking factor signal to generate said adaptive peaking signal.

2. Apparatus as set forth in claim 1, wherein said second means comprises subtraction means furnishing a subtraction signal corresponding to the difference in amplitude between said second time delayed signal and said incoming video signal, said subtraction signal constituting said peaking factor signal.

3. Apparatus as set forth in claim 2, wherein said third means comprises means for generating a magnitude signal corresponding to the magnitude of said peaking factor signal; and wherein said third means further comprises combining means for combining said magnitude signal and said first peaking signal to generate said adaptive peaking signal.

4. Apparatus as set forth in claim 2, wherein said third means comprises means for multiplying said subtraction signal by itself, thereby generating a square signal, and means for combining said square signal with said first peaking signal to generate said adaptive peaking signal.

5. Apparatus as set forth in claim 3, further comprising means connected to said magnitude signal generating means for multiplying said magnitude signal by a constant, thereby furnishing a scaled signal; and wherein said combining means combines said scaled signal with said first peaking signal to generate said adaptive peaking signal.

6. Apparatus as set forth in claim 1, wherein said third means comprises a multiplier circuit for multiplying said first peaking signal by said first peaking signal to generate said adaptive peaking signal.

7. Apparatus as set forth in claim 5, further comprising means for subtracting said scaled signal from a predetermined reference value thereby creating a final signal; and wherein said combining means combines said final signal and said first peaking signal to generate said adaptive peaking signal.

8. Method for generating an adaptive peaking signal, comprising the steps of receiving an incoming video signal having an amplitude varying as a function of time thereby furnishing a received video signal;

generating a first peaking signal in response thereto;

generating a peaking factor signal varying at least in part in accordance with a difference in amplitude of said received video signal at first and second predetermined time instants; and combining said peaking factor signal and said first peaking signal, thereby generating said adaptive peaking signal.

9. A method as set forth in claim 8, wherein said step of generating said first peaking signal comprises the step of delaying said incoming video signal by a predetermined time delay, thereby generating a time delayed signal and combining said received video signal and said time delayed signal to generate at least part of said first peaking signal.

10. The method as set forth in claim 8, wherein said step of combining said peaking factor signal and said first peaking signal comprises multiplying said first peaking signal by said peaking factor signal to provide said adaptive peaking signal.

* * * * *